US006453223B1

(12) United States Patent
Kelly et al.

(10) Patent No.: US 6,453,223 B1
(45) Date of Patent: Sep. 17, 2002

(54) INFRASTRUCTURE INDEPENDENT POSITION DETERMINING SYSTEM

(75) Inventors: Alonzo James Kelly, Pittsburgh; Robert Craig Coulter, Apollo; Mark D. Ollis, Pittsburgh, all of PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/311,683

(22) Filed: May 13, 1999

Related U.S. Application Data

(63) Continuation-in-part of application No. 08/744,053, filed on Nov. 5, 1996.

(51) Int. Cl.[7] .............................................. G06F 15/50
(52) U.S. Cl. .............................. 701/28; 318/587; 382/1
(58) Field of Search .......................... 701/28, 207, 200, 701/208, 217, 220, 223; 340/995, 998; 318/587, 568.16, 567; 901/1, 3; 180/167, 168, 169; 382/1

(56) References Cited

U.S. PATENT DOCUMENTS

| | | | |
|---|---|---|---|
| 3,788,201 A | 1/1974 | Abell .......................... 95/1.1 |
| 4,647,784 A | 3/1987 | Stephens .................. 250/559.3 |
| 4,727,492 A | 2/1988 | Reeve et al. .................... 701/25 |
| 4,799,267 A | 1/1989 | Kamejima et al. ............. 382/1 |
| 4,847,769 A | 7/1989 | Reeve ........................... 701/23 |
| 4,847,773 A | 7/1989 | van Helsdingen et al. .. 701/200 |
| 4,965,499 A | 10/1990 | Taft et al. .............. 318/568.11 |

(List continued on next page.)

FOREIGN PATENT DOCUMENTS

| | | |
|---|---|---|
| DE | 4138270 A1 | 5/1993 |
| EP | 0050101 A1 | 4/1982 |
| EP | 0190742 A2 | 8/1986 |
| EP | 0390052 A2 | 10/1990 |
| EP | 0681230 A1 | 11/1995 |
| EP | 0706105 A1 | 4/1996 |

OTHER PUBLICATIONS

Marks et al., "Real–Time Video Mosaicking of the Ocean Floor," In Proceedings of IEEE Symposium on Autonomous Underwater Vehicle Technology, Cambridge, MA, Jul. 1994, pp. 21–27.

Marks et al., "Real–Time Video Mosaicking of the Ocean Floor," *IEEE Journal of Oceanic Engineering*, vol. 20, No. 3, Jul. 1995, pp. 229–241.

Fleischer et al., "Improved Real–Time Video Mosaicking of the Ocean Floor," In Proceedings of the 1995 Oceans Conference, MTS/IEEE, Oct. 1995, pp. 1935–1944.

*Primary Examiner*—William A. Cuchlinski, Jr.
*Assistant Examiner*—Arthur D. Donnelly
(74) *Attorney, Agent, or Firm*—Kirkpatrick & Lockhart LLP

(57) ABSTRACT

A computer-assisted method for determining a position and orientation a sensor relative to a scene. The sensor has a plurality of degrees of freedom in position and orientation relative to the scene. The method includes sensing an image of the scene, the sensed image having a plurality of regions such that a sum of degrees of independent constraint of the plurality of regions equals or exceeds the degrees of freedom in position and orientation of the sensor relative to the scene, comparing the plurality of regions of the sensed image to a plurality of regions of a first image of the scene stored in a map, the first stored image representative of a position and orientation of the sensor relative to the scene, and determining sensor position and orientation based on the comparing.

37 Claims, 5 Drawing Sheets

U.S. PATENT DOCUMENTS

| | | |
|---|---|---|
| 4,979,113 A | 12/1990 | Roberts et al. ................ 701/24 |
| 5,067,081 A | 11/1991 | Person ........................ 364/444 |
| 5,081,585 A | 1/1992 | Kurami et al. .......... 364/424.02 |
| 5,109,340 A | 4/1992 | Kanayama .................... 701/25 |
| 5,170,352 A | 12/1992 | McTamaney et al. .......... 701/26 |
| 5,245,422 A | 9/1993 | Borcherts et al. ............ 358/103 |
| 5,249,126 A | 9/1993 | Hattori ........................ 701/77 |
| 5,305,217 A | 4/1994 | Nakamura et al. ............. 701/25 |
| 5,307,278 A | 4/1994 | Hermans et al. ............. 701/217 |
| 5,339,241 A | 8/1994 | Fujimori et al. ........ 364/424.02 |
| 5,363,305 A | 11/1994 | Cox et al. .................... 701/200 |
| 5,369,589 A | 11/1994 | Steiner ........................ 701/200 |
| 5,378,969 A | 1/1995 | Haikawa ................. 318/568.12 |
| 5,436,839 A | 7/1995 | Dausch et al. ............... 364/449 |
| 5,525,883 A | 6/1996 | Avitzour ...................... 318/587 |
| 5,815,825 A | 9/1998 | Tachibana et al. ............. 701/23 |
| 6,047,234 A * | 4/2000 | Cherveny et al. ............ 701/200 |

* cited by examiner

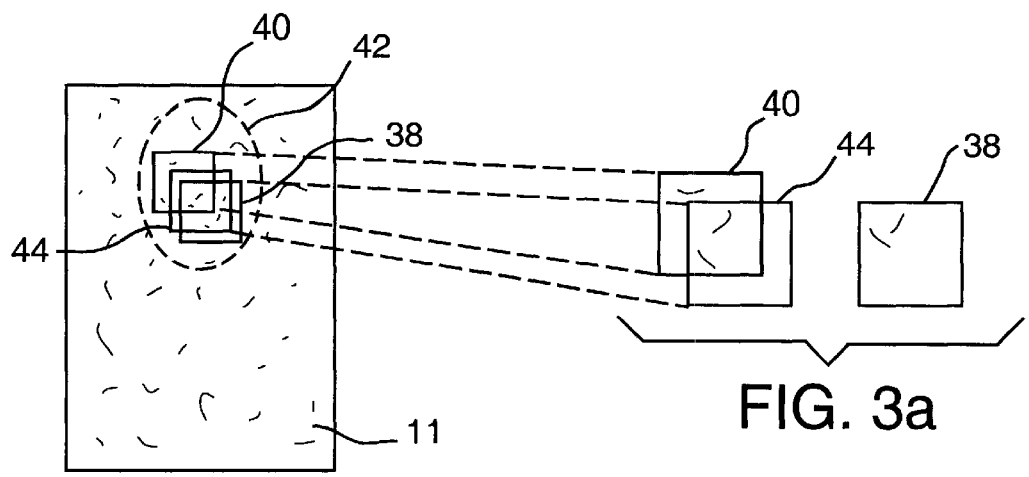
FIG. 3
FIG. 3a
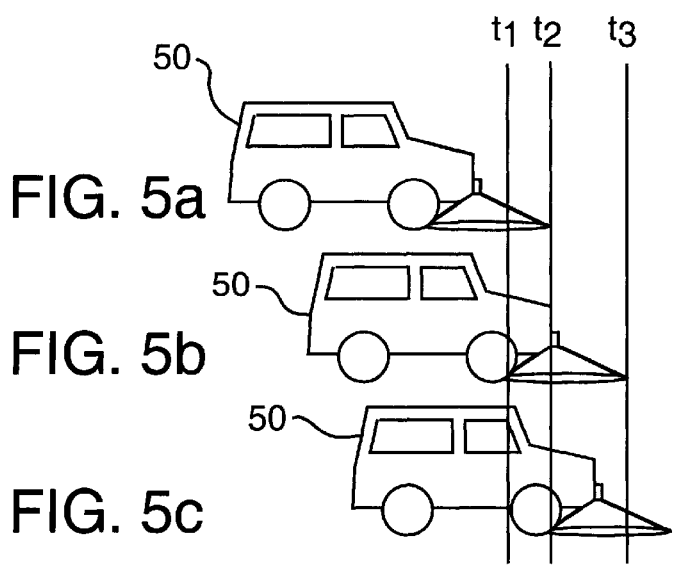
FIG. 5a
FIG. 5b
FIG. 5c
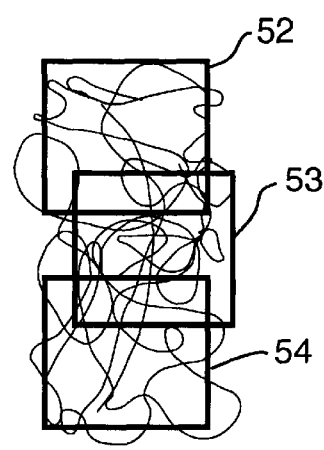
FIG. 6

INFRASTRUCTURE INDEPENDENT POSITION DETERMINING SYSTEM

CROSS-REFERENCE TO RELATED APPLICATIONS

This application is a continuation-in-part of U.S. patent application Ser. No. 08/744,053, filed Nov. 5, 1996.

STATEMENT REGARDING FEDERALLY SPONSORED RESEARCH AND DEVELOPMENT

Not Applicable.

BACKGROUND OF THE INVENTION

1. Field of the Invention

The present invention is directed generally to a method and apparatus for determining position and orientation of an object and, more particularly, to a method and apparatus for determining position and orientation of an object relative to a scene independent of infrastructure.

2. Description of the Background

High repeatability, position estimation is a key technology for mobile robotics applications such as seaport and manufacturing facility automation. Near term operations in those applications requires relatively precise positioning repeatabilities, such as, for example, approximately three millimeters. Three millimeters represents a significant improvement over the current industry standard of approximately five millimeters. The three millimeter repeatability must be achieved at an acceptable cost per unit. High end laser and inertial units are capable of meeting the technical specifications. However, their $20,000 to $100,000 plus per unit cost is far too high to be economically justifiable for most applications. Thus, a significant tradeoff exists between price and performance which prohibits flat floor mobile robotics companies from servicing existing demands in the market.

The least expensive positioning systems are so-called dead reckoning systems produced from low cost wheel encoders and a compass. Those systems produce an estimate of position based on the integration of rate measurements. Thus, they suffer from significant error accumulation in the estimate. High end dead reckoning systems, such as military grade inertial systems, reduce that problem by using rate sensors with very low error bias, but at a cost that is order of magnitudes higher than those acceptable to flat floor markets.

One low cost alternative is to combine the low cost dead reckoning system with a triangulation system, which can be used to reset the accumulated error by calculating a fix on the position. Triangulation systems do not perform integration, and thus are not affected by sensor bias. However, they suffer from dilution of precision problems that arise during the conversion of their measurements to the coordinate system of interest, e.g., a range and orientation of the sensor is converted to Cartesian space (xy). Triangulation systems take measurements with respect to external beacons or other items of infrastructure which make them vulnerable to sabotage. In certain industrial applications, sabotage is a key concern. Furthermore, the placement of beacons or other items of infrastructure represents a significant additional overhead cost to the end user. In certain applications, approximately one-third of the total cost of the system is due to the installation of beacons or other items of infrastructure.

Published German patent application DE 41 380 270 A discloses a method for the navigation of a self-propelled land vehicle in which markers are detected during travel, digitized and compared with stored data generated during a learning trip, in order to determine deviations from specified values whereby the deviations are processed into appropriate navigation control signals. The method is independent of artificial markers and ranges because natural landmarks are used as markers, which are captured as images by a video camera with two degrees of freedom. The actual position of the vehicle relative to a target point and the current vehicle direction in relation to the intended direction is calculated from the displacements of a pair of landmarks. Published European patent application EP 0 390 052 A discloses a landmark recognition system based on the perception, reasoning, action, and expectation (PREACTE) paradigm for the navigation of autonomous mobile robots. The system uses expectation to predict the appearance and disappearance of objects. The system also predicts the appearance of landmarks at different ranges and aspect angles, and uses map information to generate expectations of the scene. This system represents a classical solution, but suffers from problems associated with implementation and poor performance.

U.S. Pat. No. 4,847,769 entitled "Automated Vehicle Drift Correction" discloses a navigation system which carries out a dead reckoning calculation of the vehicles position based on inputs from sensors and the motion of a steering wheel in the preceding time interval. U.S. Pat. No. 5,307,278 entitled "Method Of Determining The Position Of A Vehicle, Arrangement For Determining The Position Of A Vehicle, As Well As A Vehicle Provided With Such An Arrangement", also relies upon dead reckoning.

U.S. Pat. No. 5,170,352 entitled "Multi-Purpose Autonomous Vehicle With Path Plotting" is an example of an autonomous vehicle which operates in conjunction with a plurality of laser, sonic, and optical sensors. Such sensors detect targets and obstacles in the work area and provide coded signals which direct vehicles over a most expedient route to a target while avoiding any obstacles.

U.S. Pat. No. 5,363,305 entitled "Navigation System For A Mobile Robot" discloses an apparatus for creating and maintaining a map of an environment the mobile autonomous robot is to transverse. A credibility measure is increased or decreased whenever a map feature assigned to a location matches or does not match, respectively, a geometric beacon corresponding to such location.

U.S. Pat. No. 4,979,113 entitled "Automated Vehicle Control" discloses a system in which data identifying locations of notational points on the floor of the area of interest are entered into a computer together with a look-up table specifying pairs of those points between which movements of vehicles may be required.

U.S. Pat. No. 4,847,773 entitled "System For Navigating A Free-Ranging Vehicle" discloses a system in which the surface to be traversed carries a grid of passive marker elements with the vehicle being provided with detectors for detecting such elements.

U.S. Pat. No. 4,647,784 entitled "Vehicle Guidance and Control System" discloses a system in which vehicles determine their own position in relation to marker boards consisting of patterns of reflective coded strips by scanning a narrow laser beam in a predetermined direction across the strips. Positions can be determined by using triangulation.

U.S. Pat. No. 4,727,492 entitled "Vehicle Control And Guidance System" discloses a vehicle guidance system which uses dead reckoning to predict the position of the vehicle. At the end of predetermined intervals, the dead reckoning is corrected by an independent fixed-target detection system using a scanning laser.

Other low cost alternatives are based on the use of vision systems to take range readings, e.g., stereo vision, of known features in an environment, such as doorways and room corners. A position is determined based on such readings. Although that method does not require the placement of infrastructure, it suffers from the significant problem of shape dependence. Briefly, what a feature looks like depends upon the angle from which it is viewed. That problem entails such computational complexity that commercially practical vision systems that operate on natural features have never been produced.

Thus, while substantial work has been directed at solving the aforementioned problems, it is seen from the prior art discussed above that such problems have not been solved. Many position determining systems are still dependent upon infrastructure which is expensive. Furthermore, once the infrastructure is in place, the facility can usually not be modified without the additional expense of modifying the infrastructure. Additionally, robots relying upon such infrastructure can easily be sabotaged.

Dead reckoning systems do not provide the repeatability required by today's commercial application. Combining dead reckoning systems with some form of triangulation or other correction method introduces infrastructure, and all of the problems associated therewith.

Vision systems, which can provide higher accuracy than dead reckoning systems and which are typically free of artificially imposed infrastructure, are difficult and costly to implement. If a feature is unrecognizable because it is approached from a different angle, the robot may become disoriented and cease to function. Thus, the need exists for a position determining system which is highly accurate, independent of all infrastructure, relatively immune to sabotage, and which provides the high repeatability demanded in today's marketplace at a competitive cost.

SUMMARY OF INVENTION

The present invention is directed to a computer-assisted method for determining a position and an orientation of a sensor relative to a scene. The sensor has a plurality of degrees of freedom in position and orientation relative to the scene. The method includes sensing an image of the scene, the sensed image having a plurality of regions such that a sum of degrees of independent constraint of the plurality of regions equals or exceeds the degrees of freedom in position and orientation of the sensor relative to the scene, comparing the plurality of regions of the sensed image to a plurality of regions of a first image of the scene stored in a map, the first stored image representative of a position and orientation of the sensor relative to the scene, and determining sensor position and orientation based on the comparing.

The present invention represents an advancement over prior position determining systems because it does not require the use of infrastructure to determine position and orientation. The present invention also has the advantage that it obviates the need to compensate for the eventuality of local distortion of the regions of the scene. The present invention also has the advantage that it can provide robust and accurate estimations of sensor position and orientation. These and other advantages and benefits of the present invention will become apparent from the description hereinafter.

BRIEF DESCRIPTION OF THE DRAWINGS

For the present invention to be clearly understood and readily practiced, the present invention will be described in conjunction with the following figures wherein:

FIG. 3 illustrates the naturally occurring features in a floor or other appropriate surface;

FIG. 3a illustrates two images from the surface of FIG. 3 which are correlated with an image representative of the actual position of the robot;

FIGS. 5a, 5b, and 5c illustrate the position of a vehicle at times $t_1$, $t_2$, and $t_3$, respectively;

FIG. 6 illustrates the images of the road at times t1, t2, and t3, respectively.

DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, other elements found in a typical position determining system, such as an operating system for a computer. Those of ordinary skill in the art will recognize that other elements may be desirable. However, because such elements are well known in the art, and because they do not facilitate a better understanding of the present invention, a discussion of such elements is not provided herein.

Figure 1:
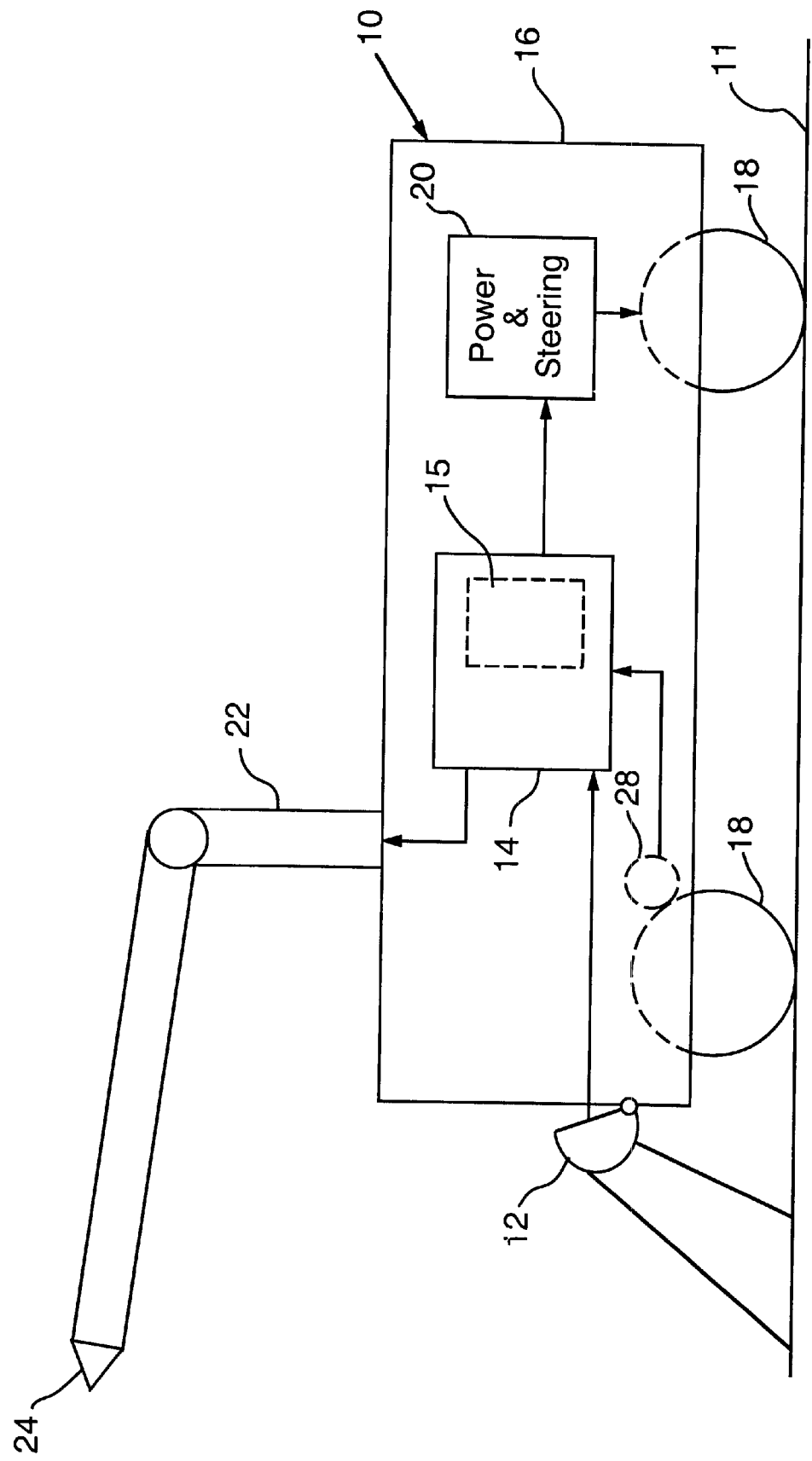
FIG. 1 illustrates a robot carrying a vision system providing input to a position determining system constructed according to the teachings of the present invention.

FIG. 1 illustrates a robot 10 in which the teachings of the present invention may be implemented. The robot 10 includes a sensor 12 which provides an input signal to a processor 14. The processor 14 may be implemented as, for example, a computer, such as a workstation or a personal computer, a microprocessor, or an application specific integrated circuit (ASIC). The robot 10 further includes a position estimator 15, which includes code to be executed by the processor 14. The robot 10 is conventional in construction and is comprised of a frame 16 and a plurality of wheels 18. Certain of the wheels 18 receive power and steering commands from a power and steering module 20 under control of the processor 14 so that the robot 10 is capable of self propulsion. The frame 16 may carry a robot arm 22 which may carry a tool 24 on its end for performing various functions under the control of the processor 14. When the robot 10 arrives at a predetermined location, which position is known by virtue of signals output by the position estimator 15, the arm 22 and tool 24 may be manipulated according to stored programs to perform predetermined functions such as picking up a work piece, positioning the work piece, inserting a bolt or screw, lifting a pallet, returning a box to storage, vacuuming a carpet, emptying a trash can, etc. For certain tasks, it is necessary that the robot 10 be precisely positioned, i.e., positioned within an acceptable degree of accuracy, such as, for example, three millimeters or less. The frame 16 may also carry an odometer 28 which provides a signal input to position estimator 15 for purposes of performing calculations, such as dead reckoning, as will be described hereinafter.

The present invention will be described herein as being implemented in a robot 10, although the present invention any be implemented to determine the position and orientation of the sensor 12 attached to any object moving in a space. For example, the present invention may be implemented in a wheeled vehicle, including automated and non-automated vehicles, with the sensor 12 oriented toward, for example, a floor, a ceiling, or a wall. The present invention may also be, for example, implemented in air and space vehicles with the sensor 12 oriented toward, for example, the stars or planetary surfaces, or in an underwater vehicle with the sensor 12 oriented toward, for example, the ocean floor. The sensor 12 is orientated to create images of a scene 11 relative to which the sensor 12 moves. The scene 11 preferably exhibits certain properties, as described further hereinafter.

The sensor 12 may be any configuration that creates imagery, including, for example, non-contact based sensing devices, such as devices based on electromagnetic, sound, or other radiation, and contact based sensing devices, such as tactile arrays. The sensor 12 may be, for example, a monochrome camera, a color camera, a multi-spectral camera, a laser range finder range channel and/or intensity channel, a radar system, or a sonar system. The sensor 12 includes a digitizer for digitizing an image sensed by the sensor 12. The digitized image from the sensor 12 is then input to the position estimator 15. The sensor 12 is orientated to capture images of the scene 11 relative to which the sensor 12 moves. The sensor 12 may be, for example, mounted to an object, such as the robot 10 as illustrated in FIG. 1, in a manner such that the sensor 12 is focused straight down or at an angle with respect to a scene 11.

For the embodiment illustrated in FIG. 1, the scene 11 is a substantially flat surface. The scene 11, however, need not by a single flat surface, and may be, for example, multiple flat and/or non-flat surfaces, or any "appropriate" surface, as further described hereinafter. According to the embodiment illustrated in FIG. 1, called a surface-referenced embodiment, the sensor 12 has two degrees of freedom in position (x,y) and one degree of freedom in orientation (θ) with respect to the scene 11. In other embodiments of the present invention, the sensor 12 may exhibit up to three degrees of freedom in position (x,y,z) and three degrees of freedom in orientation (roll, pitch, yaw) with respect to the scene 11, as described further hereinafter. The sensor 12 may be, for example, carried by the frame 16 at the bottom thereof between wheels 18, as illustrated in FIG. 1, to make it more difficult to interfere with the operation of robot 10.

The reader should recognize that the robot frame 16, wheels 18, power and steering module 20, robot arm 22, tool 24, odometer 28, and the sensor 12 are of standard construction and operation. Accordingly, those elements are not further described herein.

The present invention permits the determination of position and orientation of the sensor 12 in space. If the spatial relationship between the sensor 12 and the object to which it is mounted is always known, such as the robot 10 illustrated in FIG. 1 in which the sensor 12 has zero degrees of freedom with respect to the robot 10, then the position and orientation of the object can be determined based on the determined position and orientation of the sensor 12.

The sensor 12 may move through any medium, and senses images of the scene 11 surrounding the sensor 12. The sensor 12 is not required to move relative to the scene 11 in any particular manner. For example, for the embodiment illustrated in FIG. 1, the sensor 12 captures images of a substantially flat surface. The scene 11 may be, for example, substantially flat, as illustrated in FIG. 1, although the scene 11 may be of any arbitrary shape. The present invention will be described herein as determining the position and orientation of the sensor 12 moving relative to the scene 11, although it should be recognized that the present invention may be implemented to ensure that a particular object remains unmoved with respect to a scene 11.

The sensor 12 captures images of the scene 11 relative to which the sensor 12 moves. The image may be an array of data elements such as, for example, a one, two, or three-dimensional array. The data elements in the array may also be one, two, or three dimensional. For the surface-referenced embodiment illustrated in FIG. 1, the space through which the sensor 12 moves is two-dimensional. Images of the scene 11 may be formed by a corresponding array of sensitive elements separated in space, by a single element moving in space, or by taking several sensor readings separated in time and inferring the spatial positions to which they correspond from the known motion and sensor orientation.

In order to determine sensor position and orientation based on the sensed image of the scene 11 (called the "scene-referenced estimate"), a collection of one or more features of the scene 11 in the image, also known as regions, is required as determined by the number of degrees of freedom of sensor position and orientation that need to be resolved. For a surface-referenced embodiment, such as illustrated in FIG. 1, three degrees of freedom must be resolved (x, y, θ). In addition, each region may provide zero, one, or two degrees of constraint depending upon the region's ability to generate parallax observations, which depends on the region's distance from the sensor 12. Parallax generally refers to the principle that motion of the sensor 12 relative to the scene 11 can be estimated due to the apparent motion of regions of the scene 11 relative to the sensor 12. Fundamentally, the number of degrees of independent constraint must equal or exceed the number of degrees of freedom of sensor position and orientation that need to be resolved. Therefore, at least two regions are required for comparison, as described hereinafter, for a surface-referenced embodiment. For an embodiment in which a different number of degrees of freedom need to be resolved, a sufficient number of regions may be used such that the sum of degrees of independent constraint equals or exceeds the degrees of freedom to be resolved.

According to the present invention, the scene 11 preferably exhibits certain properties which render it appropriate. These properties need not be exhibited everywhere in the scene 11. Rather, the properties are preferably exhibited in enough regions of the scene 11 to satisfy the degree of freedom constraints, as described hereinbefore. The appearance of regions of the scene 11 is preferably sufficiently stable over the passage of operationally relevant time intervals and from operationally relevant variations in the viewing angle. The present invention operates by searching the neighborhood of the region to attempt to locate regions that are predicted to be in view. Robust recognition requires two views of the same region to be sufficiently similar in appearance. Practically, this requires that only a finite amount of transient dirt, dust, etc., obscuring the view of the region by the sensor 12, can be tolerated. The regions of the scene 11 and the intervening medium, however, need not be perfectly clean. Persistent dirt may be beneficial because it can create a textured appearance. In addition, the scene local surface roughness in the chosen region must be relatively insignificant relative to the distance between the sensor 12 and the scene 11 over the scene point generating the region. If the ratio is sufficiently small for a particular application, surface self-occlusion may be eliminated, causing the region of the scene 11 to appear substantially the same from all necessary vantage points.

The regions of the scene 11 preferably are sufficiently distinctive to their neighbors to stand out. Robust recognition of the regions requires views of regions nearby but different from a region in question to be sufficiently distinctive in appearance. Thus, it is preferable that for the scene 11, adjacent regions in a neighborhood possess texture which does not repeat within the neighborhood. That is, it is preferable that the scene 11 includes localized non-repeating regions. It is not necessary that the scene 11 include a complete lack of repetitive texture. A near repetitive local texture and a perfectly repetitive global texture are acceptable.

Moreover, it is not necessary that the entire scene 11 possess these qualities. The present invention merely requires that there exist a relatively sufficient number of regions that possess these qualities. A scene 11 exhibiting these properties may be considered an "appropriate surface," and may be, for example, a substantially flat surface, as illustrated in FIG. 1, multiple flat and/or non-flat surfaces, or any scene in which the ratio of surface roughness to the distance between the sensor 12 and the scene 11 is sufficient. Many man-made and naturally occurring environments satisfy these qualities. For example, the randomly occurring orientation and position of fibers of a carpet or brush marks in a concrete surface may possess these qualities. For scenes 11 which exhibit these features, the present invention obviates the need to compensate for the eventuality of local distortion of the regions, such as from shading, motion, focus, and unknown object size, such as is often required in the prior art. In addition, the present invention may be used, for example, to track motion of a microscope relative to an observed specimen, such as a bacteria, or a telescope relative to the galaxy.

Figure 2:
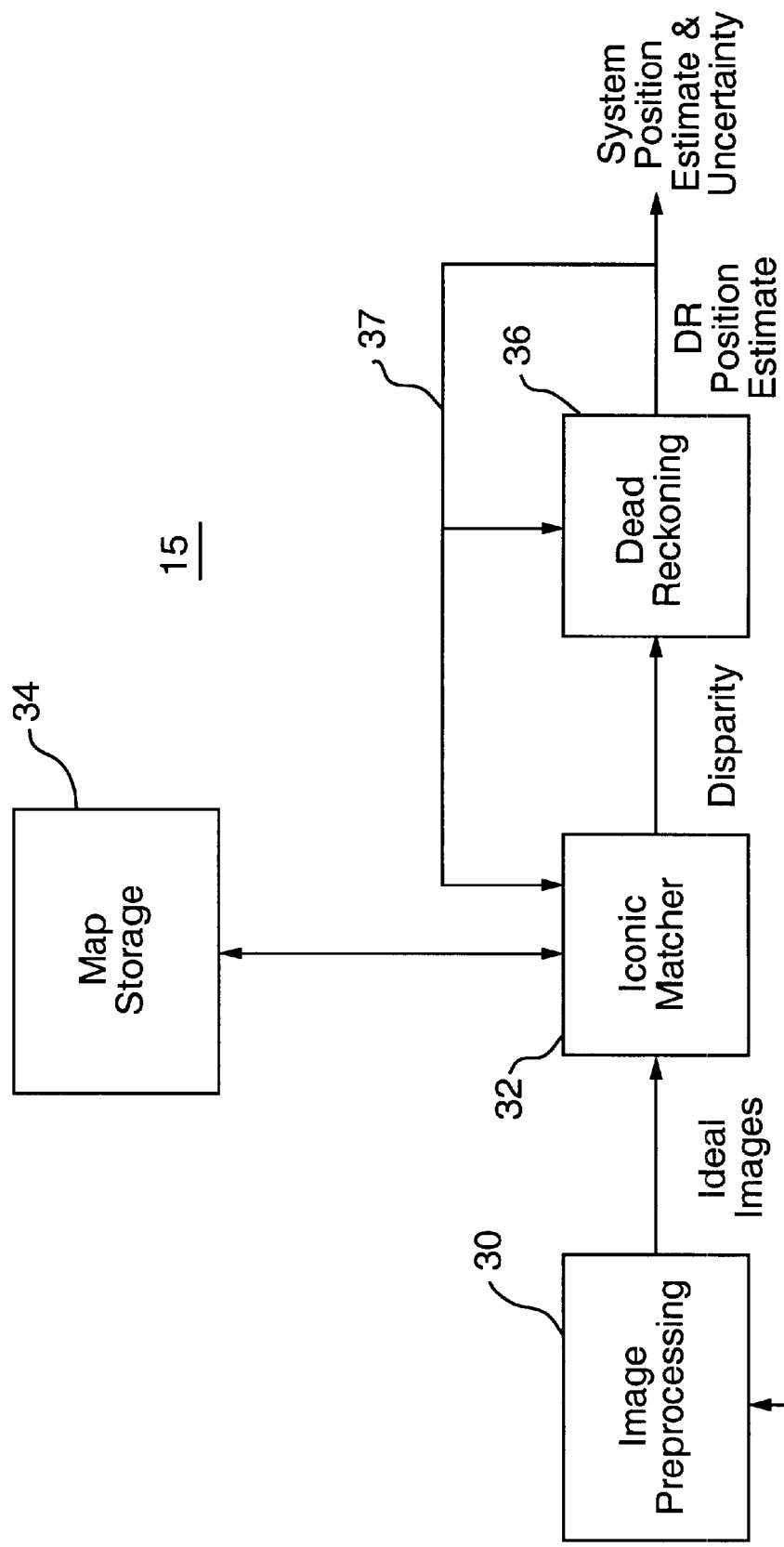
FIG. 2 is a block diagram illustrating the basic components of a position determining system constructed according to the teachings of the present invention.

Turning to FIG. 2, a block diagram of the position estimator 15 is illustrated. The position estimator 15 includes an image preprocessor 30, an iconic matcher 32, a map 34, and a dead reckoning element 36. As mentioned hereinbefore, the position estimator 15 includes code to be executed by the processor 14. The code may be implemented using any type of computer instructions, such as, for example, microcode and software, using any suitable computer language, such as C or C++ using, for example, conventional or object-oriented techniques, or in commercially available software. The code may be stored, for example, on a computer-readable medium such as, for example, a random access memory (RAM), a read-only memory (ROM), an electrically erasable programmable read-only memory (EEPROM), or a disk, such as a hard-drive, a CD-ROM, a magnetic disk, as a series of instructions or commands. The position estimator 15 may also be configured into the logic of the processor 14.

The digital images produced by the sensor 12 are input to the image preprocessor 30. The image preprocessor 30 is comprised of a set of standard preprocessing routines which remove shadows, enhance texture, and remove lens distortion. Bias and scale may also be removed. Such image preprocessing is well-known in the art and is therefore not further described.

The output of image preprocessor 30 represents ideal images which are input to the iconic matcher 32. The iconic matcher 32 performs a correlation between the ideal images and one or more images retrieved from the map 34. The map 34 contains an iconic map of the particular environment in which the sensor 12 is to move, and may be thought of as a single electronic picture of the entire scene 11 relative to which the position and orientation of the sensor 12 is to be determined. The manner in which the image is retrieved depends upon the mode of operation of the system as will be described in greater detail hereinafter. In general, if the position of the sensor 12 can be estimated by a secondary estimate, such as from dead reckoning or from an independent signal representing positioning information, then the portion of the map 34 representative of that estimated position is supplied to the iconic matcher 32 for correlation with the ideal images. If the starting position with respect to the stored map is known, then a lock may be kept on the position so that successive ideal images are compared with successive images from the map 34 in a manner such that the processor 14 continuously knows the sensor's position as shown by the feedback loop 37. Those modes of operation will be described in greater detail hereinafter.

The iconic matcher 32 uses substantially all of the data in both the real image, which is representative of the actual position of the sensor 12, and substantially all of the data from the image selected from the map, which is representative of the position where the processor 14 believes the sensor 12 is located. One way to use all or substantially all of the data is through a cross correlation function. The iconic matcher 32 may, for example, provide a disparity vector in both position and rotation based on a displacement and rotation between the ideal image and the image selected from the map 34. The iconic matcher 32 may, for example, determine the position and orientation of the sensor 12 despite unmodeled rotations of the sensor 12 without further requiring a correlation search of orientations. The iconic matcher 23 may, for example, determine position and orientation of the sensor 12 by choosing several small features, or regions, from the ideal image which are distinct and spatially dispersed. The features may be selected based on their sensed uniqueness in comparison to their neighbors. The individual small features are rotated into the coordinate system of the map, using a best guess for the rotation angle. The individual small features are then cross-correlated to the map image using a correlation operator. To augment robustness, the cross-correlation may search only the spatial domain. In alternative embodiments of the present invention, other mathematical techniques are utilized besides a cross-correlation function, including, for example, a sum of absolute differences, a sum of squared differences, and a sign correlation. The position and orientation disparity vector of the ideal image to the map image is then determined using, for example, a least squares fit to the several position cross-correlations. The resolution of the position and orientation of the sensor 12 is limited by the size of the pixels of the digitized images of the scene.

The iconic matcher 32 outputs a signal indicative of the disparity vector to the dead reckoning element 36. In one mode of operation, if the disparity vector has a value of zero, then the robot 10 is at the position represented by the image taken from map storage 34. The dead reckoning element 36 is a set of routines which compute the sensor's position and orientation by adding successive disparity vectors to an initial position. The dead reckoning element 36 also establishes the degree of uncertainty in the position estimate.

The operation of the present invention is further described with reference to FIG. 3 for a surface-referenced embodiment, such as illustrated in FIG. 1. FIG. 3 illustrates a portion of the scene 11. Assume that the sensor 12 is located at a certain starting location relative to the scene 11, and captures an image 38 of the scene 11 at that location. The sensor 12 then moves to some other location. Upon the sensor's return to the same approximate location, the sensor 12 captures a second image 40. Image 40 is then used to define a target area 42, which is an ellipse of uncertainty. The target area is then broken up into a plurality of images, two of which, 40 and 44, are illustrated in FIG. 3a. Images 40, 44, and all of the other images from target area 42, are matched with image 38 using, according to a preferred embodiment, a correlation function to determine the transform between pairs of images. The image from the target area, in this example 44, having the highest correlation with the original image 38 provides an indication of how far off the sensor 12 is from the original position as represented by image 38.

The method described above in conjunction with FIGS. 3 and 3a is only one of a variety of methods by which the present invention may be operated. The method as detailed above required the mobile robot 10 to return to within an image frame of its original location. If, instead, images of an entire building were taken, then the system could systematically search through those images calculating correlations. Sufficient storage is currently available with current technologies so that one square kilometer can be represented on a single CD-ROM. One square kilometer represents approximately 10 gigabytes, before the use of data reduction techniques. If an approximate position is available, then the search can be pruned to within an area covered by the position uncertainty ellipse 42. Even with a fairly poor independent position indication, the search can be pruned to one or a few images.

Figure 4:
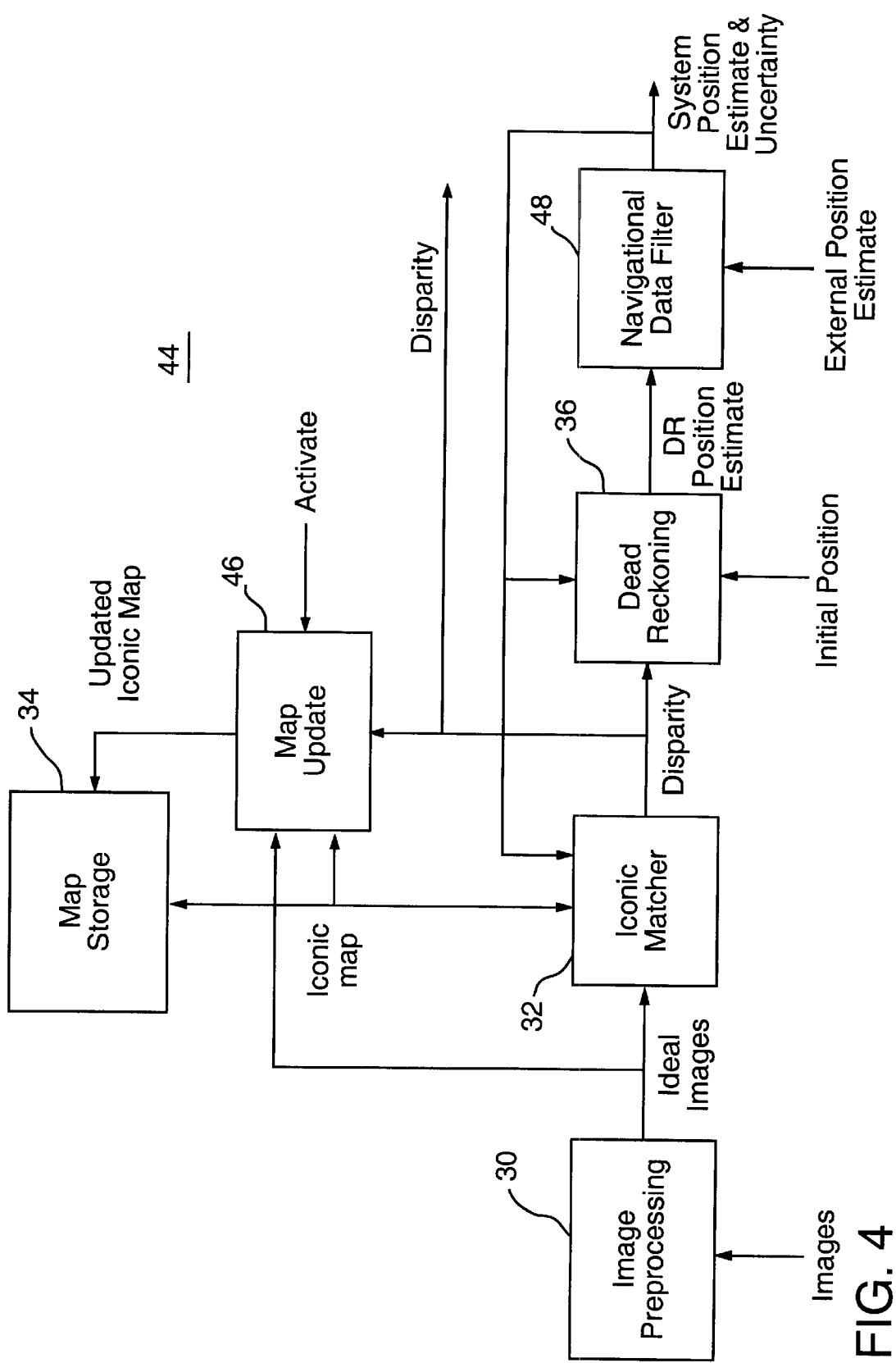
FIG. 4 is a block diagram illustrating a position determining system constructed according to the teachings of the present invention and which has mapping capability.

Turning to FIG. 4, a position estimator 44 constructed according to the teachings of the present invention is illustrated. The position estimator 44 is similar to the position estimator 15, and elements performing the same function are provided with the same reference numerals. In FIG. 4, the system 44 includes a map update element 46. The map update element 46 is a set of routines which adds images to the map when the position estimator 44 is operating in the mapping mode. The image is shifted by the negative of the disparity vector and then placed into map storage 34. Map update element 46 may be activated so as to create a map or may be activated when it is necessary to update a map because of changed scene features. For example, the position estimator 44 may update the map 34 in cases where the changes are reliably ascribed to normal wear and tear on the surfaces in the scene 11.

A navigational data filter 48 is provided which is a set of routines that process all available information to provide the best possible estimate of position. A Kalman filter is one possible implementation, but any technique for estimation of state from various measurements will suffice.

Before discussing the various modes of operation of position estimator 44, it is useful to identify the data used within position estimator 44. The initial position which is input into dead reckoning element 36 is the position to be associated with where the robot 10 was started. In the mapping mode, the initial position serves to locate the entire map. It can be an input to the system or a default value can be used. In the navigation mode, the initial position is used to restrict the initial search for a match with the iconic map. Thereafter, the system maintains a lock on the map as the robot 10 moves such that only a small amount of searching is required for each successive ideal image. The system may also be operated in the mapping mode and the navigation mode simultaneously.

An external position estimate is input to navigational data filter 48. The external position estimate is an estimate of system position that it supplied externally by a wholly separate positioning device such as odometer 28. The external position estimate is used as a redundant position indicator in both navigation and mapping modes. In both cases it is an optional input, but system absolute accuracy is expected to be improved when an external estimate is available.

The system position estimate is the estimate of position provided by the system, and the primary system output. The disparity output is the vector difference between the current estimate of vehicle position and the true position of the image in the map. When no external position is supplied, it measures differential displacement, which is easily converted to velocity by dividing by the time increment. If an external position is supplied, it is a measure of wheel slippage. The position estimate may be used by other programs in processor 14 to determine a course as is known in the art.

The navigation mode has two submodes, absolute and relative. In the absolute mode, the externally stored iconic map is used by the iconic matcher 32. In the relative mode, the last ideal image is correlated with the current ideal image. It is expected that the relative submode will exhibit poorer absolute accuracies than the absolute mode.

The position estimator 44 can be operated in an aided or unaided mode. At all times, the estimator 44 can compute its position simply by adding each successive disparity vector to the initial position. That is classically known as dead reckoning. In the aided mode, the navigational data filter element 48 and the external position estimate are activated.

The absolute and the relative modes are distinguished by the optional initial position input. If the initial position is supplied, the system can generate position relative to an external reference. If not, a default initial position is used. The default is usually zero, in which case the system reports position relative to the point where power was first applied to the system.

The estimator 44 can also be operated in a differential enabled or differential disabled mode. Those mode states are distinguished by the availability of the optional disparity output. At present, that signal can be used as a velocity signal, as a measure of wheel slip, or for such other purposes as desired by the user. That aspect of the invention is described in further detail in conjunction with FIGS. 5a, 5b, 5c, and FIG. 6.

In FIGS. 5a, 5b, and 5c, the position of a vehicle 50 carrying a system 44 of the type illustrated in FIG. 4 is illustrated at times $t_1$, $t_2$, and $t_3$. In FIG. 6, an image 52 taken at time $t_1$, an image 53 taken at time $t_2$, and an image 54 taken at time $t_3$ are illustrated. When the system 44 is operated in the differential enable mode, the disparity signal is provided as an output. When iconic matcher 32 is operated in a mode so as to compare successive images, e.g. comparing image 53 to image 52, comparing image 54 to image 53, etc., an indication of the actual distance traveled can be ascertained from the disparity signal.

The disparity signal can be used to calculate a number of parameters. For example, the distance traveled, which is the spatial difference between frames 52 and 53, over a known period of time provides an indication of speed. If the distance traveled as determined by system 44 is compared to the distance traveled as indicated by an odometer, any difference between the two calculations indicates wheel slippage. Thus, the concepts of the present invention as set forth in the disclosed method and apparatus can be used for purposes other than navigation.

Figure 7:
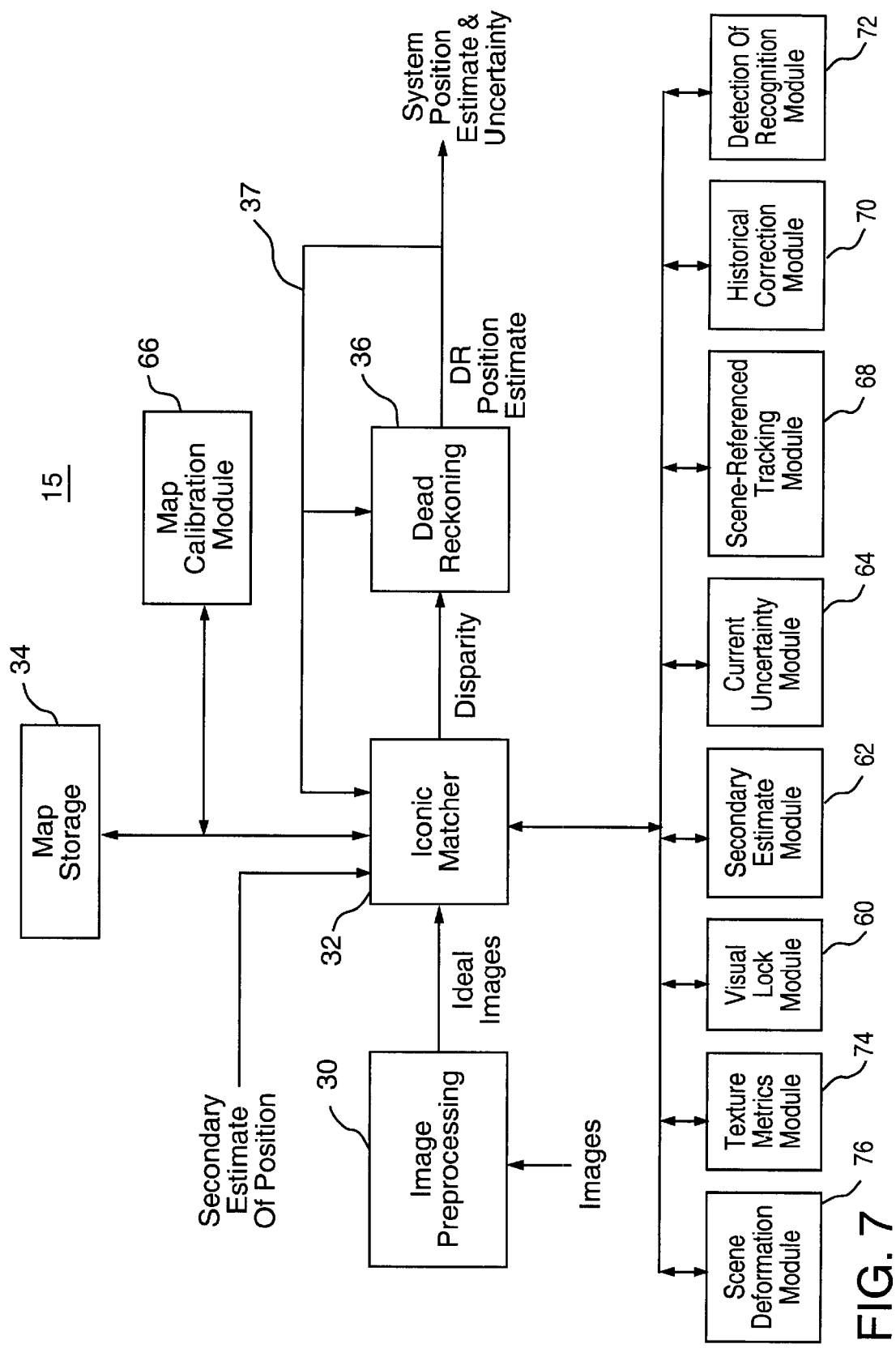
FIG. 7 is a block diagram of the position estimator of FIG. 2 according to another embodiment of the present invention.

FIG. 7 is a block diagram of the position estimator 15 of FIG. 2 in which additional modules have been included. The position estimator 15 of FIG. 7 further includes a visual lock module 60, a secondary estimate module 62, a current uncertainty module 64, a map calibration module 66, a scene-referenced estimate tracking module 68, a historical correction module 70, a detection of recognition module 72, a texture metrics module 74, and a scene deformation module 76.

The visual lock module 60 keeps a "visual lock", as described hereinafter, on the portion of the map 34 corresponding to the position of the sensor 12. The speed with which the sensor 12 is capable of moving relative to the scene 11 depends on the density of features in the images captured by the sensor 12. If the visual lock module 60 is able to find predicted features in the current region of uncertainty within which the sensor 12 is known to reside, called the search region, then it is said that a "visual lock" is being maintained on the scene. The speed of the sensor 12 is limited by the visual lock module's ability to distinguish, based solely on their sensed appearance, enough regions at a sufficient rate in the search area without losing visual lock on the scene. If the visual lock module 60 cannot distinguish enough regions at the necessary rate to support the speed of the robot 10, the visual lock module 60 may output a signal indicating that a visual lock on the scene is not being maintained. A sufficient density of features is beneficial for a visual lock to be maintained. The visual lock module 60, however, may still be able to maintain a visual lock on the scene having a sparse density of features if the visual lock module 60 is augmented by a secondary estimate of position received by the position estimator 15, such as from a dead reckoning estimate or an open loop dynamic model.

The secondary estimate module 62 determines the position and orientation of the sensor 12 with reference to the secondary estimate received by the position estimator 15. By using secondary estimates to determine position and orientation of the sensor 12, the secondary estimate module 62 may increase the speed with which the system determines sensor 12 position and orientation. The processor 14 is able to process no more than a certain maximum number of pixels per unit time. Using a secondary estimate enhances system performance by allowing the position estimator secondary estimate module 62 to only track the difference between the scene-referenced estimate and the secondary estimate. Such a secondary estimate may be generated by, for example, dead reckoning, landmark triangulation based sensors, or the use of internal models of predicted system motion based on known dynamics. For example, if a dead reckoning system accurate to 1% of distance traveled is available, it becomes possible to operate the system at 100 times the unaided speed.

Current uncertainty module 64 estimates the amount of uncertainty in position and orientation in the scene-referenced estimate based on the secondary estimate. With an estimate of current uncertainty in position and orientation, the area of the map 34 to be searched may be reduced to the amount of current uncertainty, as determined by the current uncertainty module 64, thereby enhancing computational efficiency. In addition, system performance may be enhanced by reducing the search region of the map 34 to the minimum size necessary to find unambiguous texture in the scene and to accommodate for any errors in the map 34. The computation required for cross-correlations of regions of a captured image with regions of the map depends on the size of the search area of the map 34. Secondary estimate errors, however, tend to grow linearly with time. Therefore, the current uncertainty module 64 may bound the time permitted for determination of sensor position and orientation.

Map calibration module 66 calibrates the map 34 based on a secondary estimate of position. The map calibration module 66 generates an optimal estimate of position and orientation of the sensor 12 based on the secondary estimate and the scene-referenced estimate. The map calibration estimate 66 calibrates the map 34 to cause it to agree with some standard navigational reference, such as a GPS system position estimate, by associating each optimal estimate location with one and only one scene-referenced estimate.

Scene-referenced tracking module 68 tracks the scene-referenced estimates of position and orientation of the sensor 12. Tracking the scene-referenced estimates may reduce the computational requirements of estimating future sensor position and orientation. For example, if it is possible for the optimal position to deviate significantly from the scene-referenced estimate, separately tracking the scene-referenced estimates reduces the computations required to estimate subsequent positions and orientations of the sensor 12.

The historical correction module 70 accounts for the period of time it takes to transform inputs (such as real images) to outputs (such as disparity vectors). For example, if the processor 14 requires a significant period of time to process sensed data, the historical correction module 70 may adjust a historical determination of sensor position and orientation at the time the data was acquired rather than to apply any adjustment to the current sensor position. Subsequently, the historical correction module 70 may apply the relative motion between the current and historical position to the improved historical position to determine the improved current position.

The detection of recognition module 72 provides an independent measurement of the likelihood of either false recognitions or false mis-recognitions. The measurement of the likelihood of false recognitions and false mis-recognitions is often utilized in object recognition routines. The detection of recognition module 72 may use several techniques to improve the reliability of the position and orientation estimate based on the principle that significant deviation between sensed regions and expected regions is a likely indicator of error. The detection of recognition module 72 may, for example, measure the similarity between the regions by generating independent normalized measurements of the degree of similarity. For example, cross-correlations between the current appearance and the stored, or expected, appearance of the region may be used to detect false matches. The detection of recognition module 72 may also, for example, measure the dissimilarity between the regions. For example, the detection of recognition module 72 may cross-correlate current regions in every possible configuration to a historical region. In addition, regions have a predicted relationship with respect to each other based on historical measurements. Therefore, the detection of recognition module 72 may associate an error indicated by any substantial deviation in the relative shape of regions with the offending regions. In addition, the detection of recognition module 72 may be used to diminish errors when significant disagreements occur between a secondary estimate of position and the scene-referenced estimate.

The texture metrics module 74 detects whether candidate regions of the image of the scene contain sufficient texture, i.e., the ratio of surface roughness to the distance between the surface 12 and the scene 11, of sufficient constraining power, to justify the resources required to process the image. The texture metrics module 74 may, for example, distinguish between scene texture which is one dimensional from scene texture which is two dimensional. The texture metrics module 74 may detect if a region has a direction in which texture is minimum or nonexistent, such as by diagonalization of matrices. If the texture metric module 74 determines that the candidate regions of the image do not contain sufficient texture to estimate sensor position and orientation, the texture metrics module 74 may output a signal indicating so.

Scene deformation module 76 detects whether the scene is not in its expected orientation. The scene deformation module 76 may, for example, measure the change in the dimensions between regions to ascertain whether the scene orientation is not in its expected orientation in applications where the preferred orientation of the sensor with respect to the scene can be, for example, controlled, partially measure, or assumed. For example, for a surface-referenced embodiment such as illustrated in FIG. 1, non-flat portions of the scene 11, such as a ramp, can be tolerated by the scene deformation module 76 by ascribing foreshortening or elongation of sensed inter-region dimensions to the change in orientation of the scene. To determine sensor position and orientation, the scene deformation module 76 solves for other variable degrees of freedom if a solution based on the surface-referenced embodiment degrees of freedom cannot be accurately ascertained.

While the present invention has been described in conjunction with preferred embodiments thereof, many modifications and variations will be apparent to those of ordinary skill in the art. The foregoing description and the following claims are intended to cover all such modifications and variations.

What is claimed is:

1. A computer-assisted method for determining a position and an orientation of a sensor relative to a scene, the sensor having a plurality of degrees of freedom in position and orientation relative to the scene, the method comprising:

sensing an image of the scene, the sensed image having a plurality of regions such that a sum of degrees of independent constraint of the plurality of regions equals or exceeds the degrees of freedom in position and orientation of the sensor relative to the scene;

comparing the plurality of regions of the sensed image to a plurality of regions of a first image of the scene stored in a map, the first stored image representative of a position and orientation of the sensor relative to the scene; and determining sensor position and orientation based on the comparing.

2. The method of claim 1, wherein comparing the plurality of regions of the sensed image to a plurality of regions of the first stored image includes:

selecting a plurality of regions of the sensed image;

rotating the plurality of regions into a coordinate system of the map;

correlating the plurality of regions of the sensed image to the plurality of regions of the first stored image;

performing a least squares fit of the correlations of the plurality of regions of the sensed image to the plurality of regions of the first stored image.

3. The method of claim 1, further comprising selecting the first stored image from a plurality of images stored in the map based on a degree of correlation between the sensed image and each of the plurality of stored images.

4. The method of claim 3, further comprising receiving a secondary estimate of the position of the sensor relative to the scene.

5. The method of claim 4, wherein selecting the first stored image includes selecting the first stored image from a plurality of images stored in the map, wherein each of the plurality of stored images is representative of a position of the sensor proximate to the secondary estimate of the sensor position.

6. The method of claim 4, further comprising estimating an amount of uncertainty in sensor position based on the secondary estimate and wherein selecting the first stored image includes selecting the first stored image from a plurality of images stored in the map, wherein each of the plurality of stored images is representative of a position of the sensor within the amount of uncertainty of sensor position.

7. The method of claim 1, further comprising detecting a likelihood of false recognitions of the plurality of regions of the sensed in the first stored image.

8. The method of claim 7, further comprising detecting a likelihood of false mis-recognitions of the plurality of regions of the sensed image in the first stored image.

9. The method of claim 1, further comprising detecting whether the plurality of regions of the sensed image contain sufficient features to determine the sensor position and orientation based on the comparing.

10. An apparatus for determining a position and an orientation of an object relative to a scene, comprising:

a sensor rigidly connected to the object and oriented toward the scene, the sensor having a plurality of degrees of freedom in position and orientation relative to the scene; and a position estimator in communication with the sensor, the position estimator including:

a first circuit for storing a plurality of images of the scene, each of the plurality of stored images being representative of a position and orientation of the sensor relative to the scene;

a second circuit in communication with the first circuit for comparing a plurality of regions of an image of the scene sensed by the sensor to a first stored image, wherein a sum of degrees of independent constraint of the plurality of regions of the sensed image equals or exceeds the degrees of freedom in position and orientation of the sensor relative to the scene; and a third circuit in communication with the second circuit for generating a scene-referenced estimate of sensor position and orientation.

11. An apparatus for determining a position and an orientation of an object relative to a scene, comprising;

a sensor rigidly connected to the object and orientated toward the scene, the sensor having a plurality of degrees of freedom in position and orientation relative to the scene;

a map for storing a plurality of images of the scene according to a coordinate system, each of the images being representative of a known position and orientation of the sensor relative to the scene;

means for comparing a plurality of regions of an image of the scene sensed by the sensor with a plurality of regions of a first stored image, wherein a sum of degrees of independent constraint of the plurality of regions of the sensed image equals or exceeds the degrees of freedom in position and orientation of the sensor relative to the scene; and means for generating a scene-referenced estimate of sensor position and orientation based on the means for comparing.

12. The apparatus of claim 11, wherein the means for comparing include;
   means for selecting the plurality of regions of the sensed image;
   means for rotating the plurality of regions of the sensed image into the coordinate system of the plurality of stored images;
   means for correlating the plurality of regions of the sensed image to the plurality of regions of the first stored image; and
   means for performing a least squares fit of the correlations of the plurality of regions of the sensed image to the plurality of regions of the first stored image.

13. The apparatus of claim 11, further comprising:
   means for receiving a secondary estimate of sensor position; and
   means for selecting the first stored image from the plurality of stored images based on the secondary estimate.

14. The apparatus of claim 13, further comprising means for generating an optimal estimate of sensor position and orientation based on the secondary estimate and the scene-referenced estimate.

15. A computer-readable medium having stored thereon instructions which, when executed by a processor, cause the processor to:
   receive an image of a scene sensed by a sensor oriented toward the scene, the sensor having a plurality of degrees of freedom in position and orientation with respect to the scene and the sensed image having a plurality of regions having a sum of degrees of independent constraint equal to or exceeding the degrees of freedom of the sensor relative to the scene;
   compare the plurality of regions of the sensed image to a plurality of regions of a first stored image, wherein the first stored image is representative of a known position and orientation of the sensor relative to the scene; and
   generate a scene-referenced estimate of sensor position and orientation based on the comparison.

16. The computer-readable medium of claim 15, having stored thereon further instructions, which when executed by the processor, cause the processor to select the first stored image from a plurality of images of the scene stored in the computer-readable medium based on a secondary estimate of sensor position.

17. A computer-assisted method for determining a position and an orientation of a sensor relative to a scene, the sensor having a plurality of degrees of freedom in position and orientation relative to the scene, the method comprising:
   sensing an image of a substantially flat surface, the sensed image having a plurality of regions such that a sum of degrees of independent constraint of the plurality of regions equals or exceeds the degrees of freedom in position and orientation of the sensor relative to the substantially flat surface;
   comparing two regions of the sensed image to two regions of a first image of the substantially flat surface stored in a map, the first stored image representative of a position and orientation of the sensor relative to the substantially flat surface; and
   determining sensor position and orientation based on the comparing.

18. A computer-assisted method for determining a position and an orientation of a sensor relative to a scene, the sensor having a plurality of degrees of freedom in position and orientation relative to the scene, the method comprising:
   sensing an image of the scene, the sensed image having a plurality of regions such that a sum of degrees of independent constraint of the plurality of regions equals or exceeds the degrees of freedom in position and orientation of the sensor relative to the scene;
   comparing the plurality of regions of the sensed image to a plurality of regions of a first image of the scene stored in a map, the first stored image representative of a position and orientation of the sensor relative to the scene;
   determining sensor position and orientation based on the comparing;
   selecting the first stored image from a plurality of images stored in the map based on a degree of correlation between the sensed image and each of the plurality of stored images;
   receiving a secondary estimate of the position of the sensor relative to the scene;
   generating an optimal estimate of sensor position based on the secondary estimate and the determined sensor position; and
   calibrating the map by associating a stored image representative of the optimal estimate with the determined sensor position.

19. A computer-assisted method for determining a position and an orientation of a sensor relative to a scene, the sensor having a plurality of degrees of freedom in position and orientation relative to the scene, the method comprising:
   sensing an image of the scene, the sensed image having a plurality of regions such that a sum of degrees of independent constraint of the plurality of regions equals or exceeds the degrees of freedom in position and orientation of the sensor relative to the scene;
   comparing the plurality of regions of the sensed image to a plurality of regions of a first image of the scene stored in a map, the first stored image representative of a position and orientation of the sensor relative to the scene;
   determining sensor position and orientation based on the comparing; and
   detecting whether an orientation of the scene is not an expected orientation of the scene.

20. The method of claim 19, further comprising comparing at least one additional region of the sensed image to at least one additional region of the first stored image if the orientation of the scene is not the expected orientation of the scene.

21. An apparatus for determining a position and an orientation of an object relative to a scene, comprising:
   a sensor rigidly connected to the object and oriented toward the scene, the sensor having a plurality of degrees of freedom in position and orientation relative to the scene; and
   a position estimator in communication with the sensor, the position estimator including:
      a first circuit for storing a plurality of images of the scene, each of the plurality of stored images being representative of a position and orientation of the sensor relative to the scene;
      a second circuit in communication with the first circuit for comparing a plurality of regions of an image of the scene sensed by the sensor to a first stored image, wherein a sum of degrees of independent constraint of the plurality of regions of the sensed image equals or exceeds the degrees of freedom in position and orientation of the sensor relative to the scene;
a third circuit in communication with the second circuit for generating a scene-referenced estimate of sensor position and orientation;
a fourth circuit in communication with the second circuit for receiving a secondary estimate of sensor position; and
a fifth circuit in communication with the fourth circuit for selecting the first stored image from the plurality of stored images based on the secondary estimate.

22. The apparatus of claim 21, wherein the position estimator further includes:
a sixth circuit in communication with the fourth circuit for generating an optimal estimate of sensor position and orientation based on the secondary estimate and the scene-referenced estimate; and
a seventh circuit in communication with the sixth circuit for calibrating a stored image by associating the stored image representative of the optimal estimate with the scene-referenced estimate.

23. An apparatus for determining a position and an orientation of an object relative to a scene, comprising:
a sensor rigidly connected to the object and oriented toward the scene, the sensor having a plurality of degrees of freedom in position and orientation relative to the scene; and
a position estimator in communication with the sensor, the position estimator including:
a first circuit for storing a plurality of images of the scene, each of the plurality of stored images being representative of a position and orientation of the sensor relative to the scene;
a second circuit in communication with the first circuit for comparing a plurality of regions of an image of the scene sensed by the sensor to a first stored image, wherein a sum of degrees of independent constraint of the plurality of regions of the sensed image equals or exceeds the degrees of freedom in position and orientation of the sensor relative to the scene, and wherein the second circuit includes:
a third circuit in communication with the first circuit for selecting the plurality of regions of the sensed image;
a fourth circuit in communication with the third circuit for rotating the plurality of regions into a coordinate system of the plurality of images stored in the first circuit;
a fifth circuit in communication with the fourth circuit for correlating the plurality of regions of the sensed image to the plurality of regions of the first stored image; and
a sixth circuit in communication with the fifth circuit for performing a least squares fit of the correlations of the plurality of regions of the sensed image to the plurality of regions of the first stored image; and
a seventh circuit in communication with the second circuit for generating a scene-referenced estimate of sensor position and orientation.

24. An apparatus for determining a position and an orientation of an object relative to a scene, comprising:
a sensor rigidly connected to the object and oriented toward the scene, the sensor having a plurality of degrees of freedom in position and orientation relative to the scene; and
a position estimator in communication with the sensor, the position estimator including:
a first circuit for storing a plurality of images of the scene, each of the plurality of stored images being representative of a position and orientation of the sensor relative to the scene;
a second circuit in communication with the first circuit for comparing a plurality of regions of an image of the scene sensed by the sensor to a first stored image, wherein a sum of degrees of independent constraint of the plurality of regions of the sensed image equals or exceeds the degrees of freedom in position and orientation of the sensor relative to the scene;
a third circuit in communication with the second circuit for generating a scene-referenced estimate of sensor position and orientation;
a fourth circuit in communication with the second circuit for detecting a likelihood of false recognitions of the plurality of regions of the sensed image in the first stored image; and
a fifth circuit in communication with the fourth circuit for detecting a likelihood of false mis-recognitions of the plurality of regions of the sensed image in the stored image.

25. An apparatus for determining a position and an orientation of an object relative to a scene, comprising:
a sensor rigidly connected to the object and oriented toward the scene, the sensor having a plurality of degrees of freedom in position and orientation relative to the scene; and
a position estimator in communication with the sensor, the position estimator including:
a first circuit for storing a plurality of images of the scene, each of the plurality of stored images being representative of a position and orientation of the sensor relative to the scene;
a second circuit in communication with the first circuit for comparing a plurality of regions of an image of the scene sensed by the sensor to a first stored image, wherein a sum of degrees of independent constraint of the plurality of regions of the sensed image equals or exceeds the degrees of freedom in position and orientation of the sensor relative to the scene;
a third circuit in communication with the second circuit for generating a scene-referenced estimate of sensor position and orientation; and
a fourth circuit in communication with the second circuit for detecting whether an orientation of the scene is not an expected orientation of the scene.

26. The apparatus of claim 25, wherein the position estimator further includes a fifth circuit in communication with the fourth circuit for comparing at least one additional region of the sensed image with at least one additional region of the first stored image when the orientation of the scene is not the expected orientation of the scene.

27. An apparatus for determining a position and an orientation of an object relative to a scene, comprising:
a sensor rigidly connected to the object and oriented toward the scene, the sensor having a plurality of degrees of freedom in position and orientation relative to the scene; and
a position estimator in communication with the sensor, the position estimator including:
a first circuit for storing a plurality of images of the scene, each of the plurality of stored images being representative of a position and orientation of the sensor relative to the scene;

a second circuit in communication with the first circuit for comparing a plurality of regions of an image of the scene sensed by the sensor to a first stored image, wherein a sum of degrees of independent constraint of the plurality of regions of the sensed image equals or exceeds the degrees of freedom in position and orientation of the sensor relative to the scene;

a third circuit in communication with the second circuit for generating a scene-referenced estimate of sensor position and orientation; and a fourth circuit in communication with the second circuit for detecting whether the plurality of regions of the sensed image contain sufficient features of the scene to generate the scene-referenced estimate.

28. An apparatus for determining a position and an orientation of an object relative to a scene, comprising;

a sensor rigidly connected to the object and orientated toward the scene, the sensor having a plurality of degrees of freedom in position and orientation relative to the scene;

a map for storing a plurality of images of the scene according to a coordinate system, each of the images being representative of a known position and orientation of the sensor relative to the scene;

means for comparing a plurality of regions of an image of the scene sensed by the sensor with a plurality of regions of a first stored image, wherein a sum of degrees of independent constraint of the plurality of regions of the sensed image equals or exceeds the degrees of freedom in position and orientation of the sensor relative to the scene;

means for generating a scene-referenced estimate of sensor position and orientation based on the means for comparing;

means for receiving a secondary estimate of sensor position;

means for selecting the first stored image from the plurality of stored images based on the secondary estimate;

means for generating an optimal estimate of sensor position and orientation based on the secondary estimate and the scene-referenced estimate; and means for calibrating the map based on the optimal estimate.

29. An apparatus for determining a position and an orientation of an object relative to a scene, comprising;

a sensor rigidly connected to the object and orientated toward the scene, the sensor having a plurality of degrees of freedom in position and orientation relative to the scene;

a map for storing a plurality of images of the scene according to a coordinate system, each of the images being representative of a known position and orientation of the sensor relative to the scene;

means for comparing a plurality of regions of an image of the scene sensed by the sensor with a plurality of regions of a first stored image, wherein a sum of degrees of independent constraint of the plurality of regions of the sensed image equals or exceeds the degrees of freedom in position and orientation of the sensor relative to the scene;

means for generating a scene-referenced estimate of sensor position and orientation based on the means for comparing;

means for detecting a likelihood of false recognitions of the plurality of regions of the sensed image in the first stored image; and means for detecting a likelihood of false mis-recognitions of the plurality of regions of the sensed image in the first stored image.

30. An apparatus for determining a position and an orientation of an object relative to a scene, comprising;

a sensor rigidly connected to the object and orientated toward the scene, the sensor having a plurality of degrees of freedom in position and orientation relative to the scene;

a map for storing a plurality of images of the scene according to a coordinate system, each of the images being representative of a known position and orientation of the sensor relative to the scene;

means for comparing a plurality of regions of an image of the scene sensed by the sensor with a plurality of regions of a first stored image, wherein a sum of degrees of independent constraint of the plurality of regions of the sensed image equals or exceeds the degrees of freedom in position and orientation of the sensor relative to the scene;

means for generating a scene-referenced estimate of sensor position and orientation based on the means for comparing; and means for detecting whether an orientation of the scene is not an expected orientation of the scene.

31. An apparatus for determining a position and an orientation of an object relative to a scene, comprising;

a sensor rigidly connected to the object and orientated toward the scene, the sensor having a plurality of degrees of freedom in position and orientation relative to the scene;

a map for storing a plurality of images of the scene according to a coordinate system, each of the images being representative of a known position and orientation of the sensor relative to the scene;

means for comparing a plurality of regions of an image of the scene sensed by the sensor with a plurality of regions of a first stored image, wherein a sum of degrees of independent constraint of the plurality of regions of the sensed image equals or exceeds the degrees of freedom in position and orientation of the sensor relative to the scene;

means for generating a scene-referenced estimate of sensor position and orientation based on the means for comparing; and means for detecting whether the plurality of regions of the sensed image contain sufficient features to generate the scene-referenced estimate.

32. A computer-readable medium having stored thereon instructions which, when executed by a processor, cause the processor to:

receive an image of a scene sensed by a sensor oriented toward the scene, the sensor having a plurality of degrees of freedom in position and orientation with respect to the scene and the sensed image having a plurality of regions having a sum of degrees of independent constraint equal to or exceeding the degrees of freedom of the sensor relative to the scene;

compare the plurality of regions of the sensed image to a plurality of regions of a first stored image, wherein the first stored image is representative of a known position and orientation of the sensor relative to the scene;

generate a scene-referenced estimate of sensor position and orientation based on the comparison;

select the first stored image from a plurality of images of the scene stored in the computer-readable medium based on a secondary estimate of sensor position; and generate an optimal estimate of sensor position and orientation based on the secondary estimate and the scene-referenced estimate.

33. The computer-readable medium of claim 32, having stored thereon further instructions, which when executed by the processor, cause the processor to calibrate stored images of the scene based on the optimal estimate.

34. A computer-readable medium having stored thereon instructions which, when executed by a processor, cause the processor to:

receive an image of a scene sensed by a sensor oriented toward the scene, the sensor having a plurality of degrees of freedom in position and orientation with respect to the scene and the sensed image having a plurality of regions having a sum of degrees of independent constraint equal to or exceeding the degrees of freedom of the sensor relative to the scene;

compare the plurality of regions of the sensed image to a plurality of regions of a first stored image, wherein the first stored image is representative of a known position and orientation of the sensor relative to the scene;

generate a scene-referenced estimate of sensor position and orientation based on the comparison;

select the plurality of regions of the sensed image;

rotate the plurality of regions into a coordinate system of the first stored image of the scene;

correlate the plurality of regions of the sensed image to the plurality of regions of the first stored image; and perform a least squares fit of the correlations of the plurality of regions of the sensed image to the plurality of regions of the first stored image.

35. A computer-readable medium having stored thereon instructions which, when executed by a processor, cause the processor to:

receive an image of a scene sensed by a sensor oriented toward the scene, the sensor having a plurality of degrees of freedom in position and orientation with respect to the scene and the sensed image having a plurality of regions having a sum of degrees of independent constraint equal to or exceeding the degrees of freedom of the sensor relative to the scene;

compare the plurality of regions of the sensed image to a plurality of regions of a first stored image, wherein the first stored image is representative of a known position and orientation of the sensor relative to the scene;

generate a scene-referenced estimate of sensor position and orientation based on the comparison;

detect a likelihood of false recognitions of the plurality of regions of the sensed image in the first stored image; and detect a likelihood of false mis-recognitions of the plurality of regions of the sensed image in the first stored image.

36. A computer-readable medium having stored thereon instructions which, when executed by a processor, cause the processor to:

receive an image of a scene sensed by a sensor oriented toward the scene, the sensor having a plurality of degrees of freedom in position and orientation with respect to the scene and the sensed image having a plurality of regions having a sum of degrees of independent constraint equal to or exceeding the degrees of freedom of the sensor relative to the scene;

compare the plurality of regions of the sensed image to a plurality of regions of a first stored image, wherein the first stored image is representative of a known position and orientation of the sensor relative to the scene;

generate a scene-referenced estimate of sensor position and orientation based on the comparison; and detect whether an orientation of the scene is not an expected orientation of the scene.

37. A computer-readable medium having stored thereon instructions which, when executed by a processor, cause the processor to:

receive an image of a scene sensed by a sensor oriented toward the scene, the sensor having a plurality of degrees of freedom in position and orientation with respect to the scene and the sensed image having a plurality of regions having a sum of degrees of independent constraint equal to or exceeding the degrees of freedom of the sensor relative to the scene;

compare the plurality of regions of the sensed image to a plurality of regions of a first stored image, wherein the first stored image is representative of a known position and orientation of the sensor relative to the scene;

generate a scene-referenced estimate of sensor position and orientation based on the comparison; and determine whether the plurality of regions of the sensed image contain sufficient features of the scene to generate the scene-referenced estimate.

* * * * *